United States Patent [19]

Uehara et al.

[11] Patent Number: 4,467,280
[45] Date of Patent: Aug. 21, 1984

[54] SYSTEM FOR MEASURING THE LENGTH OF A LONG MAGNETIZABLE MATERIAL

[75] Inventors: Kenichiro Uehara; Yoshihiro Nasu, both of Osaka, Japan

[73] Assignee: Sumitomo Electric Industries, Ltd., Osaka, Japan

[21] Appl. No.: 188,911

[22] Filed: Sep. 19, 1980

[30] Foreign Application Priority Data

Sep. 28, 1979 [JP] Japan .................................. 54-126628

[51] Int. Cl.$^3$ ............................................... G01B 7/04
[52] U.S. Cl. .................................... 324/206; 324/243; 33/125 T
[58] Field of Search .............................. 324/206–208, 324/239–243; 33/125 T, 127

[56] References Cited

U.S. PATENT DOCUMENTS

| | | | |
|---|---|---|---|
| 3,015,062 | 12/1961 | George et al. | 324/206 |
| 3,526,886 | 9/1970 | Lubich | 324/208 |
| 3,764,896 | 10/1973 | Manders | 324/206 |
| 4,041,610 | 8/1977 | Uesugi et al. | 324/206 |

FOREIGN PATENT DOCUMENTS 845942 7/1970 Canada .

Primary Examiner—Gerard R. Strecker
Assistant Examiner—Walter E. Snow
Attorney, Agent, or Firm—Wenderoth, Lind & Ponack

[57] ABSTRACT

A system for measuring the length of a running material such as steel cable is proposed which includes a magnetic marker, a mark detector having three magnetic sensors, and a signal handling means. The magnetic mark is accurately detected by use of the zero crossing point detection method for an accurate length measurement. An accurate measurement is further assured by various compensation arrangements.

5 Claims, 3 Drawing Figures

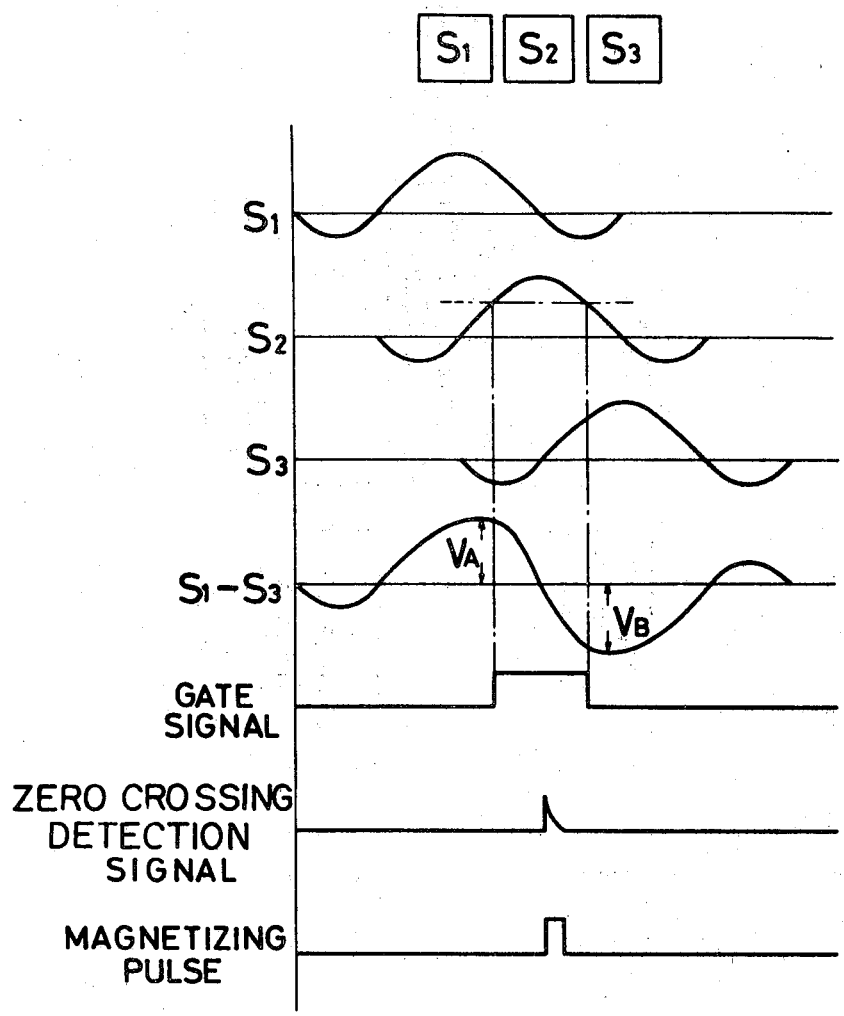

SYSTEM FOR MEASURING THE LENGTH OF A LONG MAGNETIZABLE MATERIAL

BACKGROUND OF THE INVENTION

The present invention relates to a length measuring system which permits accurate length measurement for a long magnetizable material such as a steel cable while it is running in an axial direction.

As a method for measuring the length of a long material while it is running, it is known to measure the number of revolutions per unit time of a measuring wheel or an endless belt which rotates or runs by friction with the running material, and determine the length from the number of revolutions. However, such a method has a shortcoming in that some measuring error is inevitable owing to possible slip between the running material and the measuring wheel or the endless belt. Such a friction type method has another problem in that it cannot be applied to any material having an uneven surface such as corrugated pipes and strand cables because the number of revolutions measured does not represent the length of the material accurately.

As a solution to the above-mentioned problems, a length measuring system has been used which includes a mechanical marking means and a mark reading means arranged at a fixed distance along the running direction of the material, the marking is done synchronously with the mark detection so that the length of the material can be measured by multiplying the number of mark detections by the distance between the marking means and the mark reading device. Such a conventional system has an inherent shortcoming in that there is some difficulty in marking the running material accurately and this difficulty inevitably causes some amount of error in the reading of the mark. The measuring accuracy can naturally be increased by increasing the distance between the marks, but this would result in an undue increase in the floor space requirement and could not completely eliminate error.

SUMMARY OF THE INVENTION

An object of the present invention is to provide a non-contacting type length measuring system which provides a highly accurate measurement of the length of a long magnetizable material while it is running.

BRIEF DESCRIPTION OF THE DRAWINGS

Other objects and advantages of the present invention will become apparent from the following description taken with reference to the accompanying drawings, in which:

FIG. 3 shows waveforms of various signals produced in the circuit shown in FIG. 2.

DESCRIPTION OF THE PREFERRED EMBODIMENT

Figure 1:
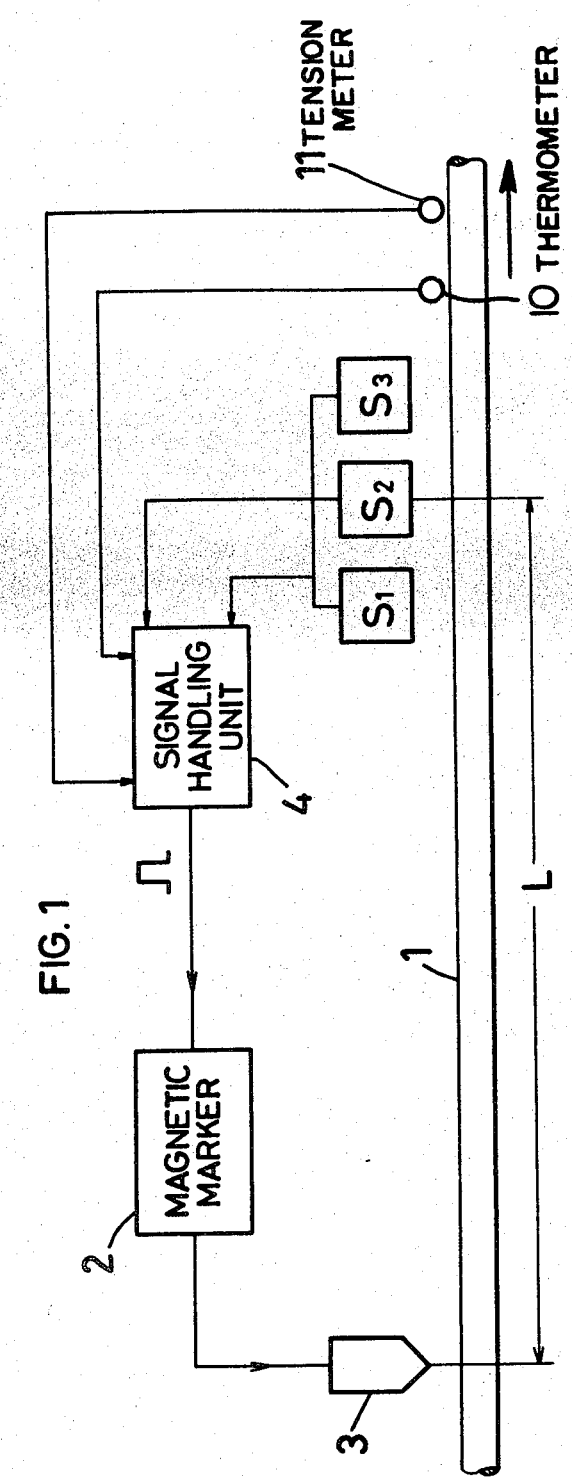
FIG. 1 is a schematic view showing the elements which comprise the length measuring system of the present invention.

Referring to FIG. 1, a long material 1 is running in the direction of an arrow. A length measuring system according to this invention includes a magnetizer or magnetic marker 2 with a marking head 3 for marking the running material 1 magnetically, a mark detection means having three magnetic sensors $S_1$, $S_2$ and $S_3$ which each have substantially the same sensitivies, and a signal handling means 4 connected to the mark detection means and transmitting a magnetizing pulse to the magnetizer 2 upon the detection of the mark by the mark detection means. The marking head 3 and three magnetic sensors are arranged along the direction in which the material is running, with a reference distance L between the marking head and the magnetic sensor $S_2$ in the center.

Figure 2:
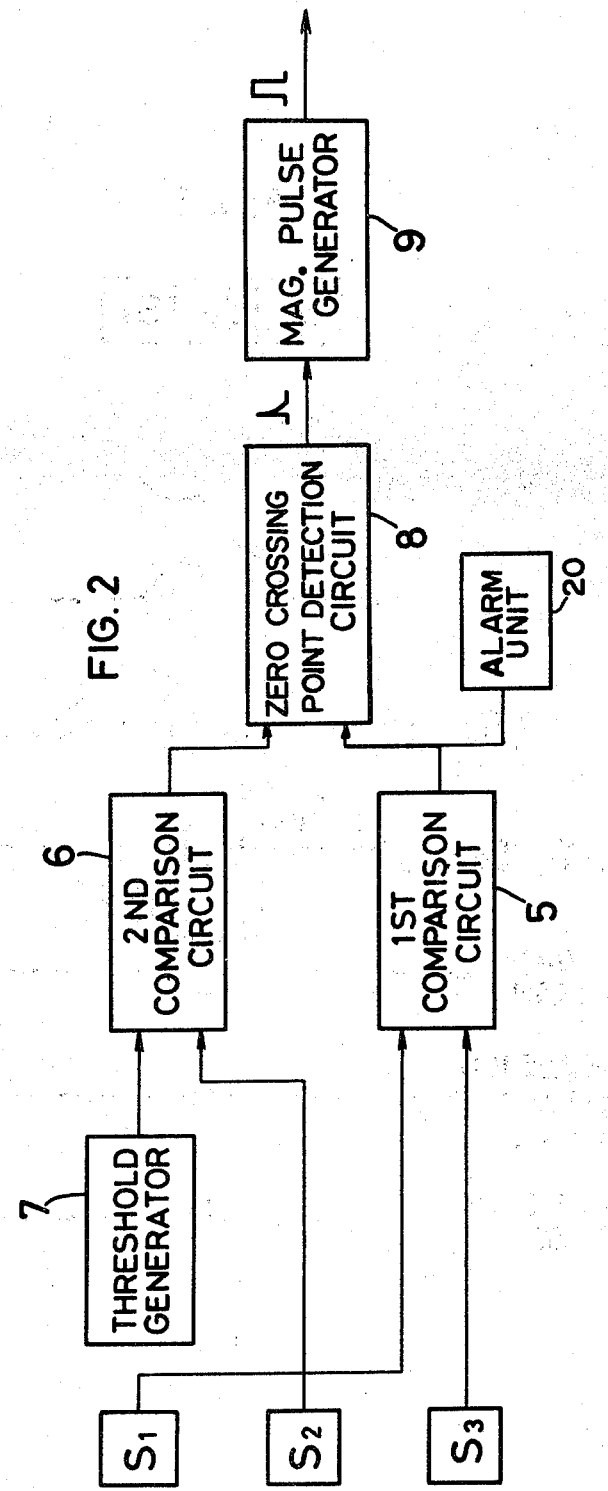
FIG. 2 is a block diagram of the signal handling means.

FIG. 2 shows a block diagram of the signal handling means which includes a first comparison circuit 5 which compares the outputs of the sensors $S_1$ and $S_3$ with each other and outputs a signal corresponding to the difference between them, a second comparison circuit 6 which compares the output of the center sensor $S_2$ with a predetermined threshold level and outputs a gate signal only while the sensor output is above the threshold level, a threshold level generator 7, a zero crossing point detection circuit 8 which detects that the output of the first comparison circuit 5 has become zero in the presence of the gate signal, and a magnetizing pulse generator 9 which shapes the output from the zero crossing point detection circuit 8 so as to provide a magnetizing pulse. The output of the first comparison circuit is also connected to an alarm unit 20.

As will be seen from FIG. 3, while the output of the center sensor $S_2$ is above the threshold level, that is, while the gate signal is fed to the zero crossing point detection circuit 8, the point where the difference between the output of sensor $S_1$ and that of sensor $S_3$ becomes zero is detected and used as a detection point. The generated magnetizing pulse may be a pulse signal having an amplitude of 15 V and a width of 5 milliseconds, for example.

With a mark detection means using the zero crossing detection method, the sensitivity characteristics of the two magnetic sensors $S_1$ and $S_3$ are very important. If the difference between their sensitivities is large, the zero point would naturally deviate from its true point. To avoid this, a circuit should preferably be provided which detects two maximum voltages of $V_A$ and $V_B$ of opposite polarity on the output waveform $S_1-S_3$ of the first comparison circuit 5 (FIG. 3) and outputs an alarm signal via the alarm unit 20 if the difference between them, $V_A - |V_B|$, exceeds a preset value.

Also, a drift compensation circuit should preferably be provided to automatically compensate for any error in the output of the mark detection means due to temperature drift because the zero crossing point can deviate from the true zero point due to temperature drift of the mark detection means. The circuit arrangement is such that if no zero crossing signal is output, the variation in the output of e.g. the first comparison circuit due to temperature change is measured and, if it exceeds a preset value, an alarm signal is output.

In operation, the running material 1 is magnetized by the marking head 3 at an interval equal to the reference distance L. The magnetic mark formed by magnetization is detected by means of three magnetic sensors by the zero crossing point detection method. Because a magnetizing pulse is fed to the marking head simultaneously with the detection of the magnetic mark, the magnetization of the running material is repeated at an accurately uniform interval. The total length of the running material is obtained by multiplying the distance L by the number of the detection signals.

In order to ensure highly accurate measurement, an additional computation circuit should preferably be provided which compensates for any error caused by the tension and temperature of the material. After the magnetic mark has been detected, the temperature and tension of the material being measured are measured by a thermometer 10 and a tension meter 11. The temperature and tension are converted to electrical signals and put into the signal handling means 4 where the measured length of the material is compensated for any error due to a change in the temperature and the tension of the material by a calculation using the following formula:

$$L_K = L_o \{1 - \alpha_c(T_M - T_S)\} \left(1 - \frac{F_M - F_S}{AE}\right)$$

wherein
$L_K$: Length compensated
$L_o$: Distance between marking head and magnetic sensor $S_2$
$\alpha_c$: Expansion coefficient of material
$T_M$: Temperature of material when measured
$T_S$: Reference temperature of material
$F_M$: Tension of material when measured
$F_S$: Reference tension of material
A: Cross-sectional area of material
E: Young's modulus of material It will be understood from the foregoing that the length measuring system according to the present invention makes possible the length measurement of pipes having an uneven surface such as corrugated pipes and can minimize the error in detecting the magnetic mark. Also, various elements which can produce errors are eliminated by electrical compensation means and an alarm signal is output if the error should exceed a preset level. These assure a high accuracy in the measurement.

We claim:

1. A system for measuring the length of a long material while it is running axially, said system comprising:
    a marking means having a marking head for magnetizing said material at intervals so as to place a magnetic mark thereon,
    a mark detection means for detecting said magnetic mark, said mark detection means comprising first and second and third sensors for detecting said magnetic mark, said sensors arranged serially in a line along the material moving direction, and
    a signal handling means operatively connected to said mark detection means and including means for detecting the point where the difference between the outputs of said first and third magnetic sensors becomes zero while the output of said second magnetic sensor is simultaneously above a predetermined threshold value and for providing a magnetizing pulse to said marking means for enabling the operation of said marking means upon the detection of said point.

2. A system as claimed in claim 1, wherein said signal handling means comprises a first comparison circuit for comparing outputs of said first and third magnetic sensors with each other and for providing an output corresponding to the difference therebetween, a second comparison circuit for comparing an output of said second magnetic sensor with said predetermined threshold value and for providing a gate signal only when said output of said second magnetic sensor is above said threshold value, a zero crossing point detection circuit for detecting the point where said difference between said outputs of said first and third magnetic sensors becomes zero simultaneous with the presence of said gate signal, and a magnetizing pulse generator for generating a magnetizing pulse and for outputting it to said marking means.

3. A system as claimed in claim 2, further comprising a means for providing an alarm signal if the difference between the maximum positive output of said first comparison circuit and the absolute value of the maximum negative output of said first comparison circuit exceeds a preset level.

4. A system as claimed in claims 1 or 2, further comprising a means for compensating the measured length for any error due to a change in the tension of the material being measured.

5. A system as claimed in claims 1 or 2, further comprising a means for compensating the measured length for any error due to a change in the temperature of the material being measured.

* * * * *